United States Patent
Xie et al.

(10) Patent No.: US 12,032,585 B2
(45) Date of Patent: Jul. 9, 2024

(54) ALTERATION OF HISTORICAL DATA REPRESENTATIONS USING DATA REPOSITORY PERFORMANCE METRICS

(71) Applicant: PayPal, Inc., San Jose, CA (US)

(72) Inventors: Kai Xie, Singapore (SG); Lin Song, Singapore (SG); Kim Dung Bui, Singapore (SG); Jintao Guo, Singapore (SG); Chun Kiat Ho, Singapore (SG); Edwin Boaz Soenaryo, Singapore (SG)

(73) Assignee: PayPal, Inc., San Jose, CA (US)

( * ) Notice: Subject to any disclaimer, the term of this patent is extended or adjusted under 35 U.S.C. 154(b) by 282 days.

(21) Appl. No.: 16/986,757

(22) Filed: Aug. 6, 2020

(65) Prior Publication Data
US 2022/0043816 A1  Feb. 10, 2022

(51) Int. Cl.
*G06F 16/24* (2019.01)
*G06F 11/34* (2006.01)
(Continued)

(52) U.S. Cl.
CPC ...... *G06F 16/2474* (2019.01); *G06F 11/3466* (2013.01); *G06F 16/219* (2019.01); *G06N 20/00* (2019.01)

(58) Field of Classification Search
CPC .......... G06F 16/24; G06F 11/34; G06F 16/21; G06F 11/30; G06F 2201/80;
(Continued)

(56) References Cited

U.S. PATENT DOCUMENTS 6,594,676 B1 * 7/2003 Moore ................ G06F 11/1469
                                                    714/E11.122
11,132,140 B1 * 9/2021 Benjamin ............. G06F 3/0619
(Continued)

OTHER PUBLICATIONS

Neo et al., "System and Method for Generating Highly Scalable Temporal Graph Database," U.S. Appl. No. 16/627,331, filed Dec. 29, 2019, 27 pages.

*Primary Examiner* — Maher N Algibhah
(74) *Attorney, Agent, or Firm* — Kowert, Hood, Munyon, Rankin & Goetzel, P.C.; Catherine L. Gerhardt; Dean M. Munyon (57) ABSTRACT

Techniques are disclosed relating to using machine learning techniques to predict storage configurations for historical data. In some embodiments, a computer system stores representations of historical data according to a current set of storage parameters. The representations may include snapshots of historical data in a data repository at different points in time. The computer system may receive queries for historical data specifying points in time from which to retrieve the historical data. In some embodiments, the computer system responds to the queries using the stored representations and determines performance metrics for the responses. In some embodiments, the computer system trains a machine learning model using the performance metrics. Based on output of the trained model, the computer system updates the current set of storage parameters. The updating may affect subsequent storage of representations in the data repository, which may advantageously improve query response times and decrease repository storage size.

20 Claims, 8 Drawing Sheets

(51) Int. Cl.
*G06F 16/21* (2019.01)
*G06F 16/2458* (2019.01)
*G06N 20/00* (2019.01)

(58) Field of Classification Search
CPC ............ G06F 2201/81; G06F 2201/84; G06F 11/1471; G06F 11/3447; G06F 11/3476; G06N 20/00
See application file for complete search history.

(56) References Cited

U.S. PATENT DOCUMENTS

| | | | |
|---|---|---|---|
| 11,182,372 B1* | 11/2021 | Jain | G06F 11/1464 |
| 2009/0313503 A1* | 12/2009 | Atluri | G06F 11/1461 |
| | | | 714/E11.023 |
| 2018/0137134 A1* | 5/2018 | Deng | G06F 16/254 |
| 2018/0373722 A1* | 12/2018 | Ulasen | G06N 3/0445 |
| 2019/0347336 A1 | 11/2019 | Jeliazkov | |
| 2021/0044604 A1* | 2/2021 | Annen | G06F 11/1484 |
| 2021/0142152 A1* | 5/2021 | Burkhart | G06K 9/6259 |
| 2021/0200659 A1* | 7/2021 | Gowda | G06F 3/0604 |
| 2021/0241180 A1* | 8/2021 | Vishwakarma | G06N 5/003 |
| 2022/0043573 A1* | 2/2022 | Sanchez | G06F 11/1448 |

* cited by examiner

Method 700

Store, according to a current set of storage parameters, representations of historical data, where the representations include snapshots of historical data in a data repository at different points in time.
710

Receive queries for historical data, where the queries specify points in time from which to retrieve the historical data.
720

Respond to the queries using the stored representations.
730

Determine performance metrics for responses to the queries.
740

Train, using the performance metrics, a machine learning model.
750

Update, based on output of the trained machine learning model, the current set of storage parameters, where the updating affects subsequent storage of representations in the data repository.
760

ALTERATION OF HISTORICAL DATA REPRESENTATIONS USING DATA REPOSITORY PERFORMANCE METRICS

BACKGROUND

Technical Field

This disclosure relates generally to database systems, and, more specifically, to techniques for training a machine learning model to predict configurations for storing historical data e.g., used to generate training data for training different instances of a machine learning classifier.

Description of the Related Art

Long-term storage of large amounts of historical data (often referred to as "big data") that is frequently queried often results in high demands on a storage system. For example, the amount of storage space necessary to provide various different types of historical data as well as maintain a low latency for queries to this storage system is often expensive for the entity providing the data. In addition, over time the amount of data stored by the storage system continues to grow. In some situations, an entity may choose to purchase less storage space or may purchase less efficient forms of storage (e.g., hard disk drive (HDD)), which may increase latency when retrieving data from the storage system. As a result, systems that use the retrieved data become slow and products generated by these systems often experience an increase in time to market (TTM).

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "computer system configured to update a current set of storage parameters" is intended to cover, for example, a computer system that performs this function during operation, even if it is not currently being used (e.g., when its power supply is not connected). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed mobile computing device, for example, would not be considered to be "configured to" perform some specific function, although it may be "configurable to" perform that function. After appropriate programming, the mobile computing device may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a computing system having multiple user accounts, the terms "first" and "second" user accounts can be used to refer to any users. In other words, the "first" and "second" user accounts are not limited to the initial two created user accounts, for example.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of options. This phrase is not to be interpreted to require that there is at least one instance of w, at least one instance of x, at least one instance of y, and at least one instance of z.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor and is used to determine A or affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, a "module" refers to software and/or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC. Accordingly, a module that is described as being "executable" to perform operations refers to a software module, while a module that is described as being "configured" to perform operations refers to a hardware module. A module that is described as operable to perform operations refers to both a software module, a hardware module, or some combination thereof. Further, for any discussion herein that refers to a module that is "executable" to perform certain operations, it is to be understood that those operations may be implemented, in other embodiments, by a hardware module "configured" to perform the operations, and vice versa.

DETAILED DESCRIPTION

Techniques are disclosed for using machine learning techniques to determine storage configurations for storing historical data representations in order to facilitate storage and retrieval of various different types of "big data." With the growing popularity of machine learning in various different fields, efficient storage and retrieval of big data used to train machine learning models has become increasingly important. Specifically, the disclosed techniques may advantageously provide data sets for training machine learning models earlier in time than was previously possible. That is, training data generated using traditional techniques is often generated from data recorded several months prior. Using the current techniques, however, data that is merely days old may be used in training. For example, the disclosed system may be used to calculate sets of labeled features from retrieved historical data for training different instances of a machine learning classifier prior to labels for those features being mature. Comparison of the different trained instances may indicate whether the performance of machine learning classifiers trained using immature training data is satisfactory (e.g., whether they are usable in production). In this way, the disclosed techniques may quickly provide historical data for back-filling features for training machine learning models. As one specific example the disclosed data retrieval system may advantageously provide historical data for feature backfilling such that features become mature within hours rather than months. That is, recent data may be used earlier for training, which may result in machine learning models that are more accurate than models trained using older data.

In order to store and retrieve historical data efficiently, the disclosed system may implement a data repository that stores different types of representations of historical data. As one specific example, the data repository may store snapshots and journals. As used herein the term "snapshot" is intended to be construed according to its well-understood meaning, which includes a representation of data at a given point in time. For example, a snapshot of a record of data for a particular user may include the name, employment status, salary, etc. of that user at a given point in time. In this example, different snapshots of the user's record of data may include different employment status, salary, etc. for this user. As used herein, the term "journal" is intended to be construed according to its well-understood meaning, which includes incremental changes to a set of historical data relative to a particular snapshot. These incremental changes may be associated with consecutive points in time. For example, a journal may indicate that a particular user's last name has changed from "Doe" to "Smith" relative to a prior snapshot of the particular user's data. Example snapshots and journals are discussed below with reference to FIGS. 2A and 2B.

Implementation of the data repository is performed based on a determined balance between a number of journals and a number of snapshots to be stored in the data repository. Said another way, the disclosed system attempts to find a balance between query performance (e.g., low latency) and storage space (e.g., purchasing smaller amounts of storage space). For example, the disclosed system may operate according to various storage parameters, including thresholds such as a journal threshold indicating a number of journals that may exist between two consecutive snapshots. Such storage parameters are determined based on querying the data repository. For example, if queries to the data repository are slow due to a large number of journals being retrieved, the disclosed system may generate additional snapshots of the retrieved historical data to reduce the size of data retrieved from the repository during future queries. Storage parameters for the data repository may be determined using machine learning techniques. For example, performance metrics for various queries to the data repository are input to a machine learning model. Based on output of this model, the system updates storage parameters for the data repository. For example, snapshots may be generated more frequently for historical records with a greater number of changes and less frequently for historical records with a smaller number of changes.

In the PAYPAL context, transaction data for a particular merchant (e.g., for the last 14 days, month, year, etc.) may be retrieved by the disclosed system. Based on this data, a machine learning model may be trained to predict the future transaction volume for this merchant. In response to the output of the machine learning model indicating that the transaction volume (e.g., on a given day) for this merchant will exceed a transaction threshold, information (e.g., know your customer (KYC) information) may be proactively obtained and updated for this merchant. This may, in turn, provide a seamless transition for this PAYPAL customer once they exceed the transaction threshold by preventing the need for that customer to halt transactions until they have satisfied compliance requirements.

Example Database System

Figure 1:
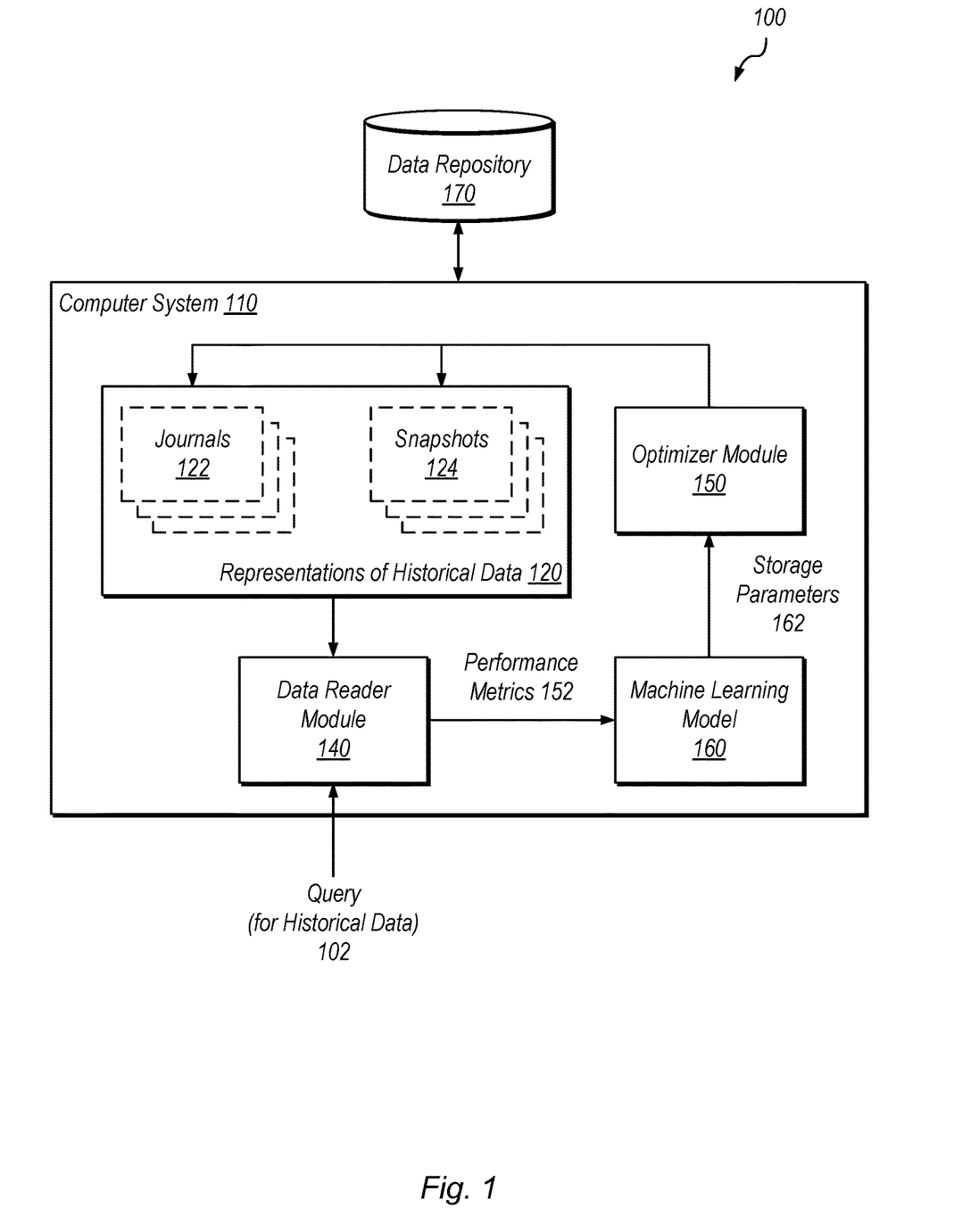
FIG. 1 is a block diagram illustrating an example computer system configured to process queries for historical data and update a data repository based on performance metrics for the queries, according to some embodiments.

FIG. 1 is a block diagram illustrating an example computer system configured to process queries for historical data and update a data repository based on performance metrics for the queries. In the illustrated embodiment, system 100 includes a data repository 170 and a computer system 110, which in turn includes, a data reader module 140, an optimizer module 150, and a machine learning model 160. In some embodiments, data reader module 140, optimizer module 150 and machine learning model 160 are executed in a distributed manner. For example, one or more computer systems 110 may be used to run the components shown in FIG. 1 and may facilitate communication between the components through a network or message queue, for example. Note that system 100 may be any of various database management systems.

Computer system 110, in the illustrated embodiment, is configured to maintain various representations 120 of historical data in data repository 170. In response to receiving a query 102 for historical data, computer system 110 is configured to retrieve representations 120 of historical data from data repository 170 using a data reader module 140. In addition to retrieving and providing historical data in response to queries 102, computer system 110 is configured to generate performance metrics 152 for the queries. Computer system 110 is also configured to train machine learning model 160 using performance metrics 152. Based on output of a trained version of machine learning model 160, computer system 110 is configured to generate storage parameters 162. These storage parameters may be used to alter storage of data representations in a data repository. In some embodiments, computer system 110 trains machine learning model 160 using one or more of the following: a genetic algorithm, a fuzzy algorithm, adaptive gradient+root mean square propagation (ADAM) algorithm, GAUSSIAN mixture model, various expectation-maximization algorithms, neural networks, etc. In situations in which computer system 110 trains using a GAUSSIAN mixture model (or other similar models), the computer system may first detect a hidden pattern or correlation and then deduct rules from the pattern. The rule deduction may be done manually by a system administrator, for example.

Optimizer module 150 is operable to update (or replace) a current set of storage parameters for data repository 170 based on machine learning output. In this way, the updated set of storage parameters affect subsequent storage of representations in the data repository. That is, computer system 110 may subsequently update representations of historical data stored in data repository 170 according to the new storage parameters 162. In some embodiments, computer system 110 stores a greater number of a particular type of representation in data repository 170 than another type of representation based on the updated set of storage parameters. For example, computer system 110 may generate and store more snapshots 124 of historical data than journals 122 in data repository 170.

Data reader module 140, in the illustrated embodiment, receives query 102 for historical data. This module then retrieves representations of historical data 120 from data repository 170 for responding to query 102. Data reader module 140 also collects metrics for the response (e.g., query latency) and provides these performance metrics 152 for training machine learning model 160. Data reader module 140 is discussed in detail below with reference to FIGS. 4 and 5.

The disclosed techniques may advantageously decrease the amount of storage space needed to store historical data, which in turn may reduce the cost to an entity maintaining the historical data. Consider a situation in which a daily snapshot is taken of a set of historical data over a period of four months. Using the disclosed techniques and maintaining an average query latency of approximately 10 to 20 milliseconds, the necessary storage space for this set of historical data is estimated at 1 terabyte, while the same set of historical data stored using traditional storage techniques often requires upwards of 2000 terabytes of storage. Consider another situation where a particular historical record of data has a high volume of updates e.g., 10 million journals each day. In this situation, if a single daily snapshot is created, the query latency for this record would be poor since a given query would involve reading one snapshot and millions of journals. The disclosed optimization techniques could generate additional snapshots based on a latency requirement for this record (e.g., latency <100 ms). Although this would require additional storage, it would advantageously decrease the number of journals being queried and, therefore, decrease the latency of queries for this record.

Example Data Retrieval

Figure 2A:
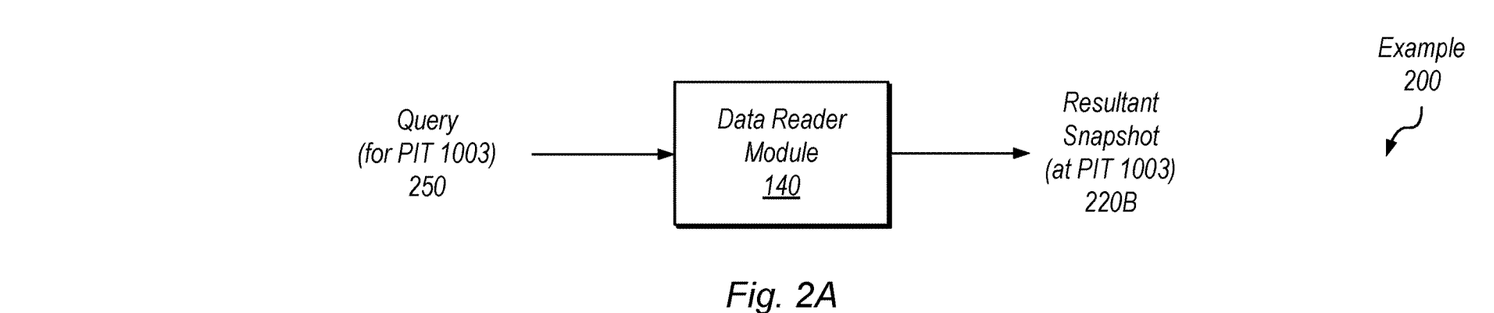
FIGS. 2A and 2B are diagrams illustrating an example query and an example resultant snapshot generated in response to the query, respectively, according to some embodiments.
Figure 2B:
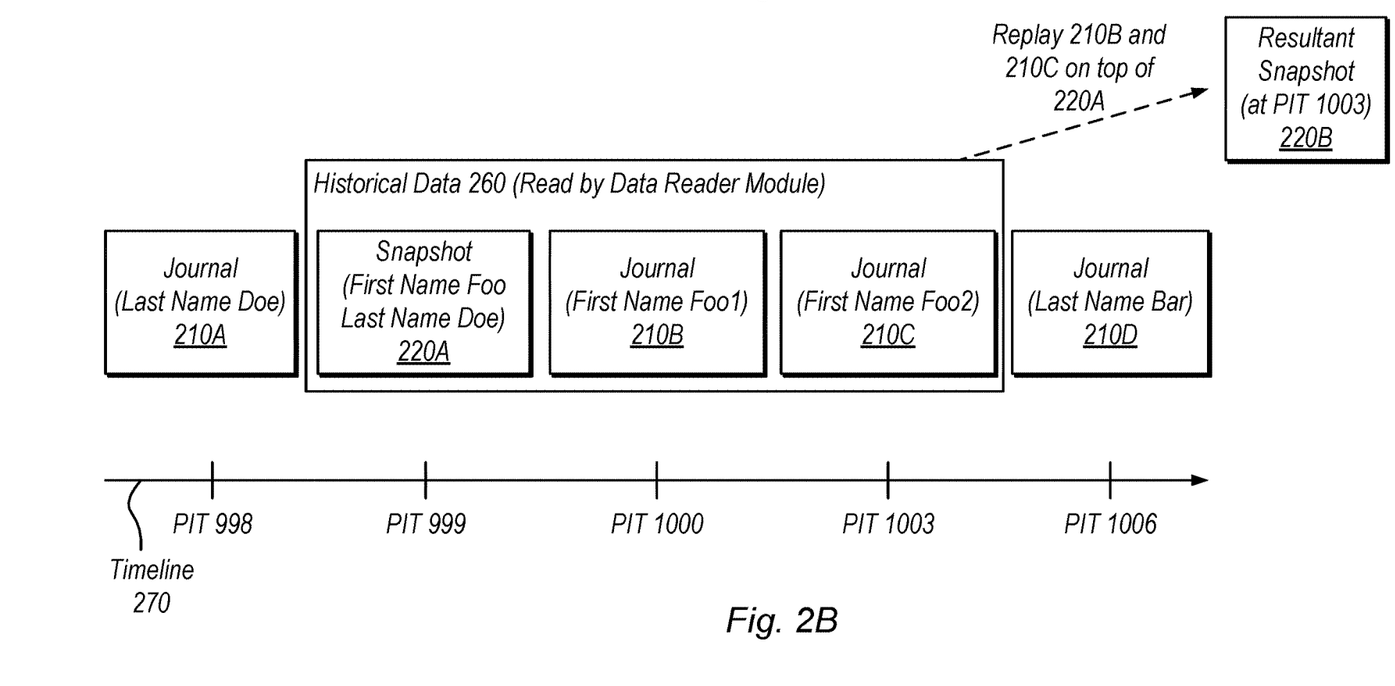

FIGS. 2A and 2B are diagrams illustrating an example query and a resultant snapshot generated in response to the query, respectively. In the illustrated embodiment, example 200 shows generation of a resultant snapshot 220B based on a query 250. In FIG. 2A, data reader module 140 receives a query 250 for point in time 1003 and generates a resultant snapshot 220B of historical data at point in time 1003.

In FIG. 2B, an example timeline 270 is shown to include points in time 998 to 1006. Various journals 210 and a snapshot 220A are shown at different points along timeline 270. These journals 210 and snapshot 220A may be stored in data repository 170, for example. Journal 210A shows changes made to a record storing user data between a previous snapshot and PIT 998. For example, since a previous snapshot, a user's last name has been changed to "Doe." At PIT 999, a snapshot 220A of the record is shown in which the user's full name is "Foo Doe." Journals 210B and 210C show changes in the user's first name at points in time 1000 and 1003, respectively. Another journal 210D at PIT 1006 shows a change in the user's last name to "Bar." In the illustrated embodiment, a set 260 of historical data read by data reader module 140 from data repository 170 is shown within a box. The set 260 of historical data includes snapshot 220A and journals 210B and 210C. Data reader module 140 is operable to use set 260 of data to generate resultant snapshot 220B at PIT 1003. This resultant snapshot 220B may be used to respond to query 250 and future queries for data at PIT 1003, for example.

Example Journal Module

Figure 3:
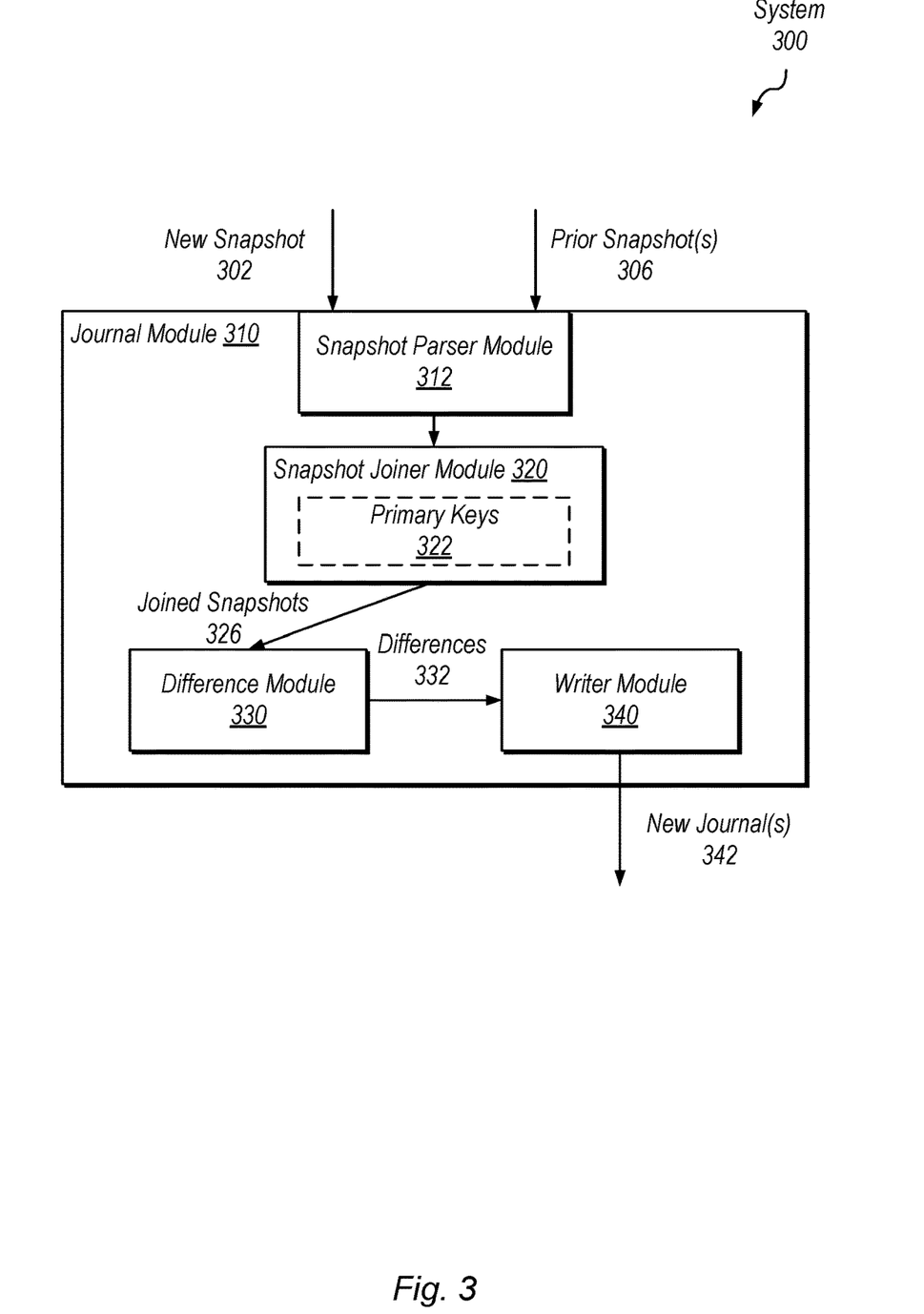
FIG. 3 is a block diagram illustrating an example journal module, according to some embodiments.

FIG. 3 is a block diagram illustrating an example journal module. In the illustrated embodiment, system 300 includes a journal module 310 configured to receive snapshots and generate journals indicating changes between consecutive pairs of snapshots. Note that journal module 310 may be included in computer system 110.

Journal module 310, in the illustrated embodiment, includes a snapshot parser module 312, a snapshot joiner module 320, a difference module 330, and a writer module 340. Journal module 310 is operable to receive new snapshots 302 and prior snapshots 306 and generate new journals 342. In various situations, journal module 310 is configured to receive two snapshots associated with consecutive points in time and generate one or more journals representing various changes made to historical data between the two snapshots. For example, if three changes have been made to a given record of historical data between two consecutive snapshots, then journal module 310 may generate three new journals 342. In contrast, journal module 310 may generate a single journal 342 which specifies the three changes between the two consecutive snapshots.

Snapshot parser module 312, in the illustrated embodiment, receives new snapshot 302 and one or more prior snapshots 306 and parses these snapshots to produce a readable format (e.g., readable to snapshot joiner module 320). In some embodiments, journal module 310 receives snapshots from various tenants. These tenants may provide snapshots in various different formats. For example, snapshots 302 and 306 may be received in "big data" format such as APACHE AVRO or POCKET, or any of various JavaScript frameworks. Such formats may allow these tenants to store larger amounts of data relative to data in other formats. Snapshot parser module 312 then provides snapshots to snapshot joiner module 320 in a format that is readable by the joiner module.

In some embodiments, computer system 110 is configured to read new snapshot 302 and prior snapshots 306 from data repository 170 and provide these snapshots to snapshot parser module 312. These snapshots may include a flat file header specifying the schema of these snapshots. In this way, tenants of computer system 110 can provide their particular schemas without registering the schemas of their snapshots prior to use of the system. For example, based on schemas specified in the flat file header of snapshots 302 and 306, journal module 310 is able to receive snapshots in in-memory form. As one specific example, journal module 310 may be built on top of the HADOOP map reduce or SPARK frameworks, allowing for distributed processing of big data. Journal generator module 310 may track the history of snapshot schemas. For example, module 310 may perform deserialization of the binary payload of snapshots using the schemas of these snapshots. Note that some deserialization formats, such as KYRO or MESSAGEPACK, however, may not require a schema for deserialization. In some situations, tracking the history of schema may assist in monitoring and auditing any unexpected backwards incompatible schema changes.

Snapshot joiner module 320 receives snapshots 302 and 306 in parsed format from module 312 and determines primary keys 322 stored within these snapshots. Primary keys 322 are unique identifiers (IDs) of snapshots. In some embodiments, primary keys for various snapshots are pre-registered by a particular tenant utilizing system 110. In the illustrated embodiment, however, journal module 310 determines primary keys 322 by reading this information from the snapshots received from computer system 110. In some embodiments, primary keys 322 are timestamps of journals. Snapshot joiner module 320 then joins new snapshot 302 and a consecutive prior snapshot 306 by their primary keys. As one specific example, snapshot joiner module 320 may be a joiner mechanism provided by HADOOP map reduce.

Difference module 330, in the illustrated embodiment, determines differences between joined snapshots 326 received from module 320. As discussed above, there may be numerous changes made to historical data between two consecutive snapshots. Difference module 330 identifies these changes among fields of the joined snapshots. For example, if snapshots 302 and 306 capture a particular record of data at different points in time, difference module 330 checks whether fields of this record have changed since the prior snapshot 306 was captured.

Writer module 340 generates one or more new journals 342 based on differences 332 received from difference module 330. Writer module 340 generates one or more new journals 342 based on the number of differences 332 and storage parameters of the data repository. For example, the storage parameters may specify a number of journals to be generated for every X number of differences between two consecutive snapshots. Another storage parameter may specify to generate journals when the size (e.g., in bytes) of a snapshot has exceeded a size threshold. Still other storage parameters specify to generate journals based on the percentage of size differences between snapshots, number of differences among fields of a record between snapshots, an amount of time that has passed since a particular field of a historical record was changed (e.g., to ensure that journals are not generated too frequently), etc.

Note that various examples herein discuss storage of tenant data, but these examples are discussed for purposes of explanation and are not intended to limit the scope of the present disclosure. In other embodiments, any of various types of historical data may be stored by the disclosed system.

Example Snapshot Module

Figure 4:
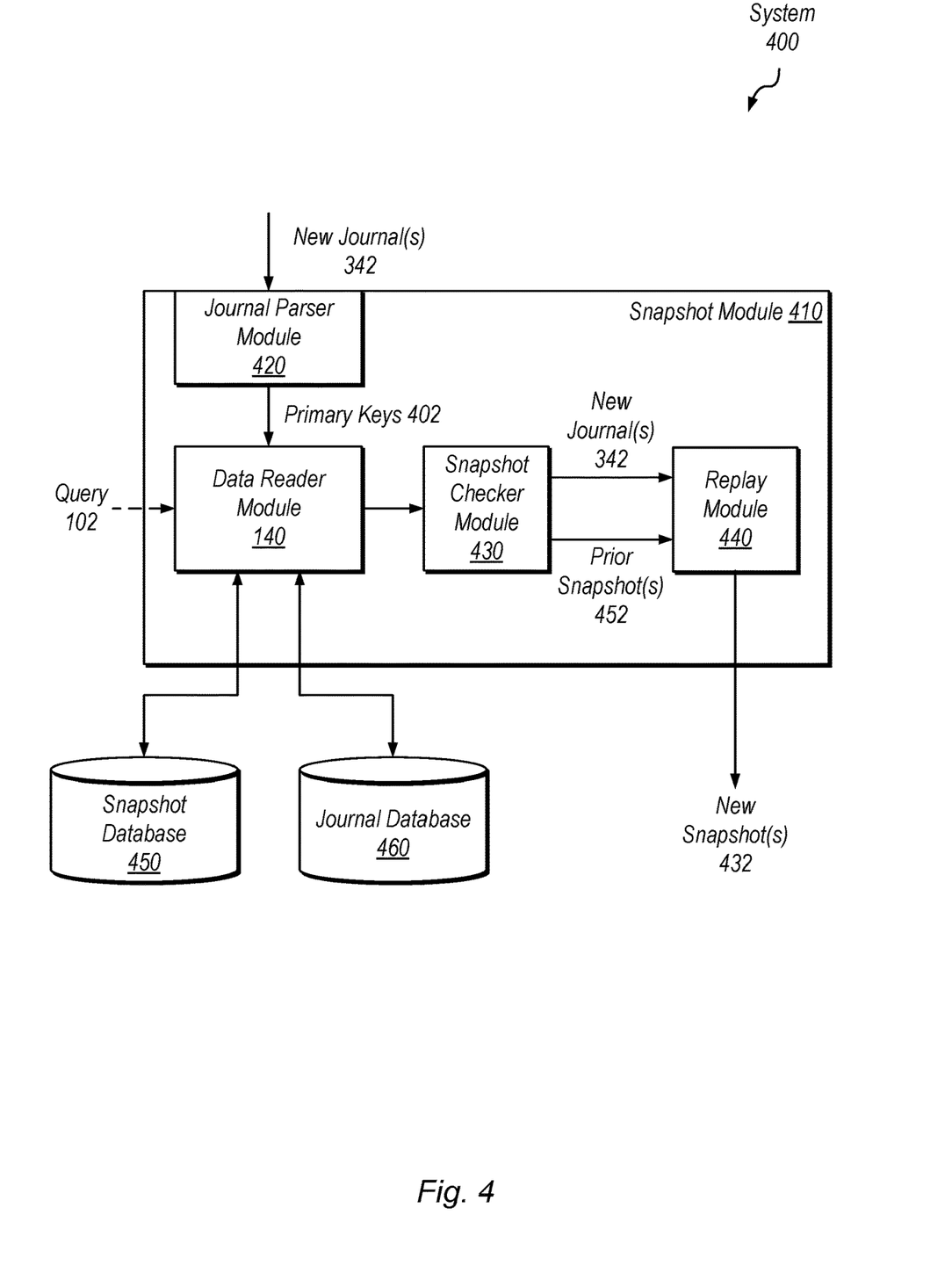
FIG. 4 is a block diagram illustrating an example snapshot module, according to some embodiments.

FIG. 4 is a block diagram illustrating an example snapshot module. In the illustrated embodiment, system 400 includes a snapshot database 450, a journal database 460, and a snapshot module 410, which in turn includes a journal parser module 420, data reader module 140, a snapshot checker module 430, and a replay module 440.

Snapshot module 410, in the illustrated embodiment, is operable to receive one or more new journals 342 and generate one or more new snapshots 432 based on these journals. Journal parser module 420 may receive one or more new journals 342 from journal module 310. Journal parser module 420 ingests journals in binary form, for example, and places them in in-memory form based on the schema associated with the journals. As discussed above with reference to snapshots, journal schemas may be pre-registered by a tenant or may be specified in the flat file header of journals. Journal parser module 420 then parses the journals to determine primary keys 402 for each journal, for example. Journal parser module 420 provides these primary keys 402 to data reader module 140. Similar to primary keys 322 for snapshots 302 and 306, primary keys 402 for journals 342 may be timestamps.

Data reader module 140 retrieves snapshots from snapshot database 450. For example, data reader module 140 may scan snapshot database 450 to obtain closest prior snapshots associated with each primary key 402. These snapshots are associated with points in time that are prior to the point in time specified by the primary key, but are closest to the primary key time. In addition, data reader module 140 may scan journal database 460 from each snapshot to the point in time specified by the primary key which, in some cases, may be a current point in time. A scan of journal database 460 for a particular snapshot returns one or more journals that are associated with timestamps between the point in time of the particular snapshot and the point in time specified by the primary key 402 determined from a particular new journal. Data reader module 140 sends retrieved snapshots and journals to snapshot checker module 430 for evaluation.

Snapshot checker module 430 determines, based on respective snapshot and journal groups received from data reader module 140, whether to generate one or more new snapshots. Snapshot checker module 430 may evaluate received snapshots and journals read from the databases 450 and 460 according to any of various storage parameters 162 in order to determine whether to generate new snapshots. For example, storage parameters 162 may include a delta threshold that specifies a number of changes to be included in respective journals. The delta threshold parameter specifies that a journal may include a single change between two consecutive snapshots or a plurality of changes between these two snapshots. Storage parameters 162 may also include a payload threshold parameter specifying a total size e.g., in bytes of a set of journals that is allowed when responding to a query. For example, if the size of a set of journals needed to respond to a query is too large, then the payload threshold will be satisfied and the disclosed system may generate additional snapshots. This may, in some situations, reduce latency for various future queries. Said another way, if the size of a set of journals used in responding to a query is very large, then the latency of that query will also be large.

Snapshot checker module 430 may determine, based on a storage parameter specifying an age threshold, whether to generate additional snapshots from one or more journals based on these journals being older than a particular point in time indicated by the age threshold. That is, if the point in time associated with a most recent journal in a set of journals between two consecutive snapshots is older than a threshold number of days, weeks, months, etc. the snapshot checker module 430 will generate at least one new snapshot between the two consecutive snapshots using the set of journals.

In some embodiments, snapshot module 410 is operable to delete one or more snapshots. For example, based on snapshot checker module 430 determining that too many snapshots are stored in snapshot database 450 according to storage parameters 162, snapshot module 410 may delete one or more snapshots stored in database 450. In some embodiments, snapshot module 410 is operable to provide new snapshots in response to various queries 102 via data reader module 140. Data reader module 140 is discussed in further detail below with reference to FIG. 5. In some embodiments, snapshot module 410 is configurable for different tenants. For example, if a particular tenant accesses a larger amount of data stored by data repository 170 than other tenants, snapshot checker module 430 may generate and store a greater number of snapshots for this tenant. This may improve the latency of the system in responding to queries from this tenant.

Example Data Reader Module

Figure 5:
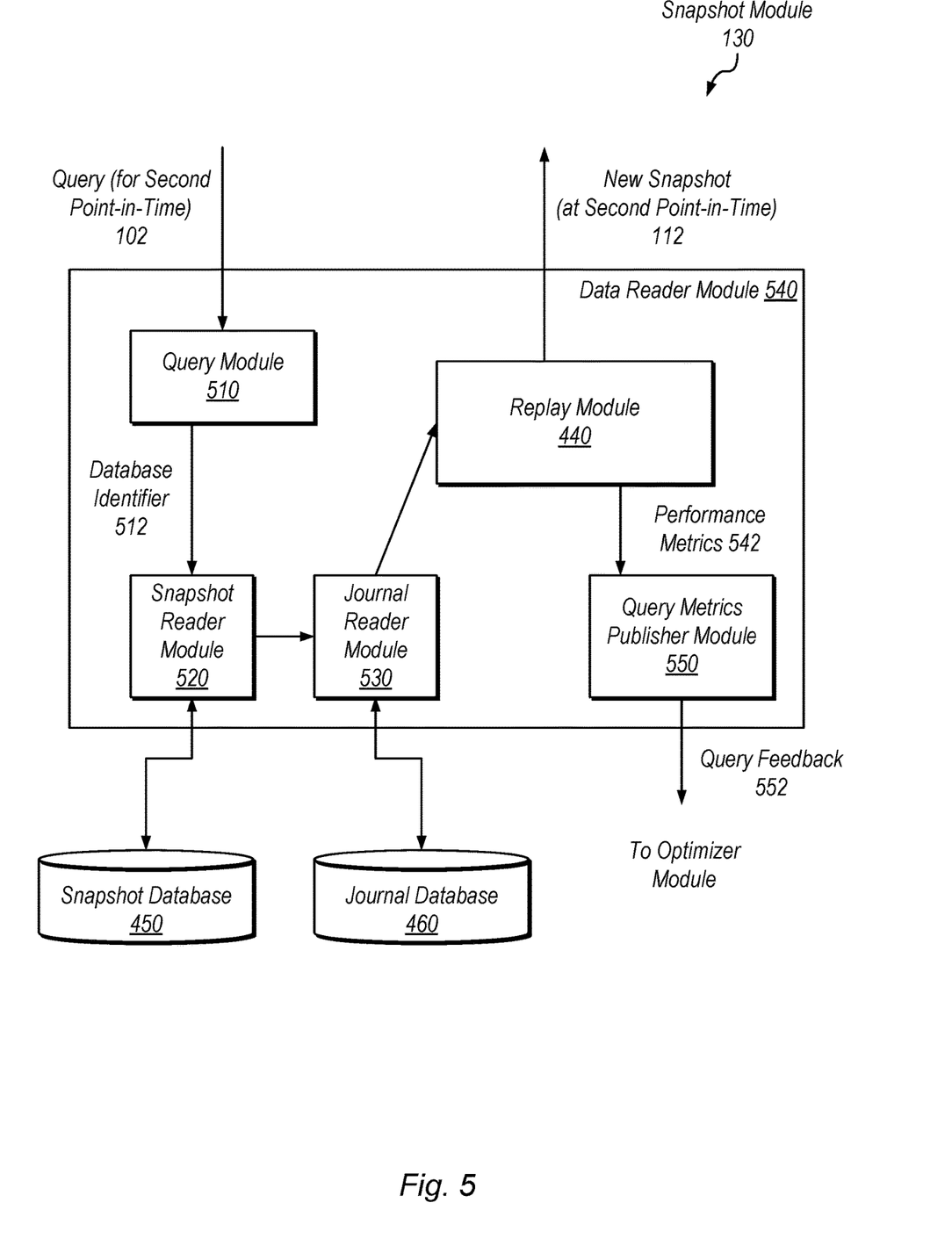
FIG. 5 is a block diagram illustrating an example data reader module, according to some embodiments.

FIG. 5 is a diagram illustrating an example data reader module. In the illustrated embodiment, data reader module 540 includes query module 510, replay module 440, snapshot reader module 520, journal reader module 530, query metrics publisher module 550, snapshot database 450, and journal database 460.

Query module 510, in the illustrated embodiment, receives a query 102 for a second point in time and rewrites the query to generate a database identifier 512 for use in querying databases. For example, the query may specify a data set name and query module 510 may map this to a database identifier 512 in situations where databases maintained by computer system 110 are optimized in some way e.g., to reduce payload size. Query module 510 then passes database identifier 512 to snapshot reader module 520.

Snapshot reader module 520 scans snapshot database 450 using database identifier 512 to identify a snapshot that occurs prior to a point in time specified in query 102 and is closest to the query point in time relative to other snapshots stored in the database. Snapshot reader module 520 passes the snapshot point in time for the identified snapshot to journal reader module 530 which scans journal database 460 from the snapshot point in time to the query point in time to identify a set of journals between these two points in time. Journal reader module 530 then passes the identified snapshot and the set of one or more journals to replay module 440. In some embodiments, the scan of journal database 460 may not return any journals between the two points in time. Said another way, there may not be any changes made to a record requested in query 102 between a most recent snapshot and the point in time specified in the query. In this situation, journal reader module 530 sends the identified snapshot to replay module 440 without journals.

In some embodiments, snapshot reader module 520 and journal reader module 530 query databases 450 and 460 in parallel. For example, if data reader module 540 knows the point in time for the most recent snapshot up front, then journal reader module 530 is able to query journal database 460 from the recent snapshot point in time to the query point in time. In this situation, data reader module 540 may know the distribution of snapshots within database 450. As one specific example, if snapshots are spaced out every month, then the system knows that for a query requesting data on June $15^{th}$ the most recent snapshot is June $1^{st}$ and will query this snapshot and all the journals from this snapshot to the requested point in time (i.e., June $15^{th}$).

Replay module 440, in the illustrated embodiment, replays the set of journals on top of the identified snapshot to generate a new snapshot 112 at the second point in time. Replay module 440 then provides the new snapshot in response to query 102. In situations in which journal reader module 530 passes a single snapshot retrieved from snapshot database 450 to replay module 440, module 440 simply provides the identified snapshot in response to the query 102. Replay module 440 also generates performance metrics 542 for responses to various queries 102 and provides these metrics to query metrics publisher module 550.

Example performance metrics 542 may include query latency, snapshot payload, journal payload, etc. In addition, metrics collected from the snapshot database 450, metrics collected from the journal database 460, etc. may be provided to query metrics publisher module 550. As one specific example, a latency metric included in metrics 542 may indicate a time interval between receiving queries and generating responses using stored snapshots and journals. As discussed above with reference to FIG. 1, optimizer module 150 may adjust representations 120 of historical data based on performance metrics. Therefore, optimizer module 150 may adjust a number of stored snapshots and journals based on the latency metric for various queries.

Query metrics publisher module 550 attempts to publish all metrics related to query 102. Publishing of performance metrics 542 includes providing query feedback 552 to optimizer module 150. Query 102 may be submitted in asynchronous mode or synchronous mode. If query 102 is specified in asynchronous mode, replay module 440 fulfills the promise by setting new snapshot 112 to the promise. Alternatively, if query 102 is specified in synchronous mode, replay module 440 responds to the query with new snapshot 112.

Note that the data reader module 540 shown in FIG. 5 may be the same portion of software as the data reader module 140 shown in FIGS. 1, 2A, 2B, and 4. The application programming interface (API) call to these two configurations, however, may be different. For example, the data reader module 540 shown in FIG. 5 includes replay module 440, while data reader module 140 shown in FIG. 4 is operable separately from the replay module. These different API calls are primarily focused on different functionality. Specifically, data reader module 540 is operable to handle queries but is not necessarily focused on generating new snapshots for storage in snapshot database (this functionality is performed by data reader module 140). Data reader module 540, however, is operable to generate performance metrics 542 for responses to queries.

Example Optimizer Module

Figure 6:
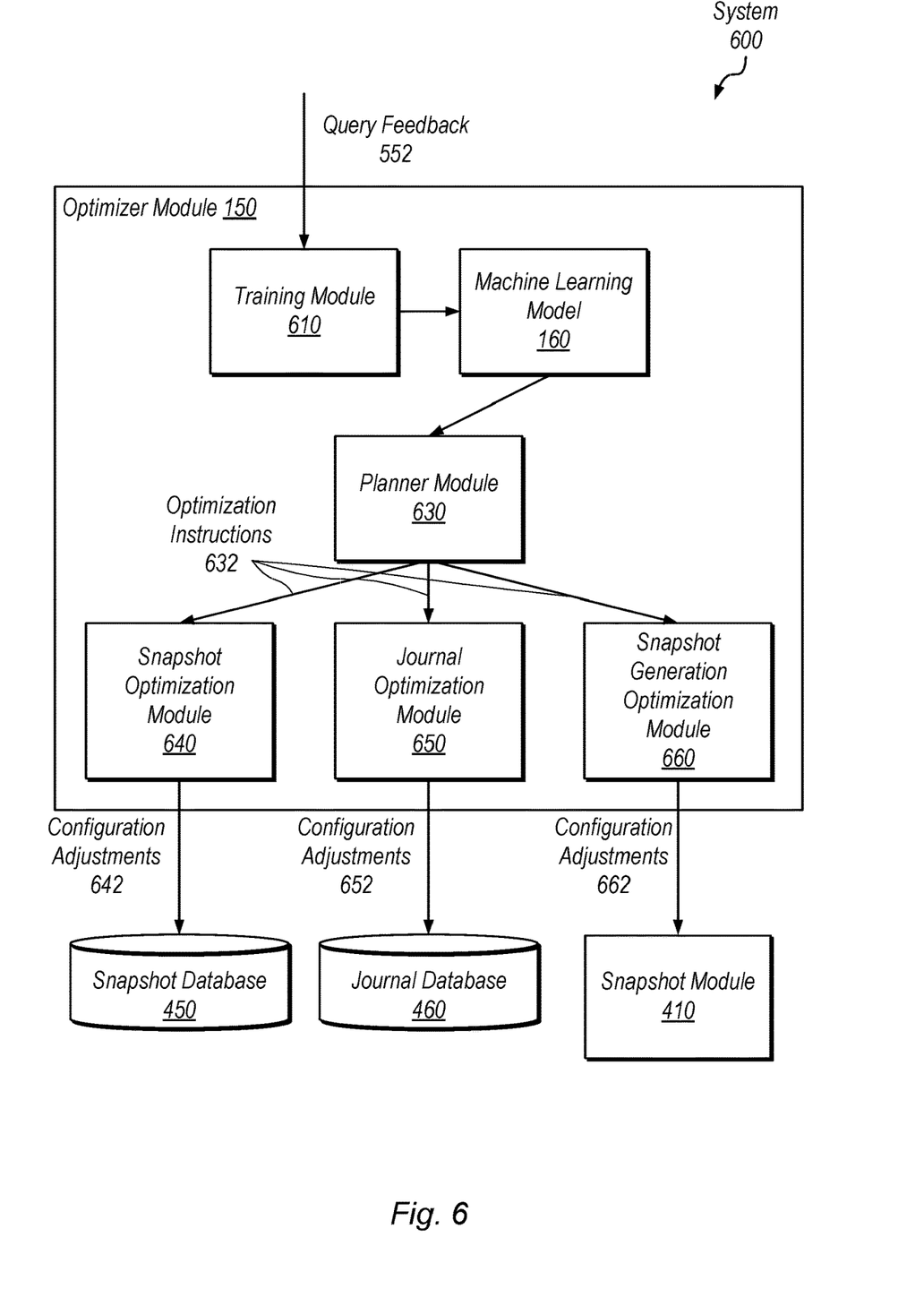
FIG. 6 is a block diagram illustrating an example optimizer module, according to some embodiments.

FIG. 6 is a diagram illustrating an example optimizer module. In the illustrated embodiment, system 600 includes snapshot database 450, journal database 460, snapshot module 410, and optimizer module 150, which in turn includes training module 610, machine learning model 160, planner module 630, snapshot optimization module 640, journal optimization module 650, and snapshot generation optimization module 660. In some embodiments, optimizer module 150 is operable to utilize machine learning for determining a balanced configuration for various components of system 600. For example, the optimizer module may determine a balance between query performance (e.g., faster response times) and storage space (e.g., smaller amounts of storage are often less expensive).

Training module 610 receives query feedback 552 from data reader module 540 and uses this information to generate training data for training machine learning model 160. For example, training module 610 may generate various labeled machine learning features from the performance metrics 542 indicated in query feedback 552. During training, machine learning model 160 may provide output to training module 610 and the training module may adjust training accordingly. Once training module 610 is satisfied with the output of machine learning model 160, this model is used to generate configurations for one or more of snapshot database 450, journal database 460, and snapshot module 410. In some embodiments, machine learning model 160 outputs predicted configurations for journal module 310. These predicted configurations are passed to planner module 630.

In some embodiments, training module 610 receives query feedback 522 in real-time computing (RTC) form or in the form of HTTP requests. For example, the disclosed system may be operating using APACHE KAFKA or the microservice provided by SPRING BOOT (to handle HTTP requests). In some embodiments, training module 610 transforms this information into in-memory format in order to generate training data. In other embodiments, the feedback data is saved directly to a file and used for training at a later point in time.

Planner module 630 compares predicted configurations output by a trained machine learning model with current configurations of various ones of snapshot database 450, journal database 460, and snapshot module 410. Based on the comparison, planner module 630 provides optimization instructions 632 to snapshot optimization module 640, journal optimization module 650, and snapshot generation optimization module 660 for tuning respective data representation modules. These instructions 632 specify one or more updates to be made to these modules. In some embodiments, machine learning model 160 outputs a predicted access frequency for future queries to snapshot database 450 and journal database 460. Planner module 630 may then compare these predictions with prior accesses to determine adjustments for the databases.

Snapshot optimization module 640, in the illustrated embodiment, executes optimization instructions 632 for snapshot database 450 by performing configuration adjustments 642 of the database. Similarly, journal optimization module 650 performs configuration adjustments 652 for journal database 460. For example, the configuration adjustments 642 and 652 may include instructions for altering various storage parameters 162 associated with these databases, including altering the amount of storage space included in these databases, altering the size of different portions of these databases, etc. Altering the size of different portions of these databases may include altering a portion associated with a high access frequency (e.g., increasing the size of solid-state drive (SSD) storage) or a portion associated with low access frequency (e.g., increasing hard disk drive (HDD) storage), or both. For example, based on the number of queries received in the past four to five months for a set of historical data at a particular point in time, the disclosed system may place snapshots and journals used to respond to these queries in high access frequency storage. In some embodiments, snapshot optimization module 640 performs configuration adjustments 642 on snapshot database 450 while journal optimization module 650 does not alter journal database 460. In some embodiments, altering storage parameters 162 associated with databases 450 and 460 includes adjusting the block read size for these databases. For example, when snapshot database 450 receives a request to read a set of historical data, it may read a block of data from disk that includes the requested set of historical data. If, however, the block read size is much larger than the size of the requested set of historical data, then disk input/output is wasted, impacting the throughput performance of this database. Conversely, if the block read size is too small and does not retrieve the entire set of historical data, the database will need to access the disk multiple time, introducing latency. Therefore, optimization modules 640 and 650 may adjust the block read size.

Snapshot generation optimization module 660, in the illustrated embodiment, performs configuration adjustments 662 for snapshot module 410. For example, module 660 may alter snapshot module 410 such that it changes the frequency of snapshot generation at various points in time, increases a number of journals used to generate respective snapshots, etc.

Example Method

Figure 7:
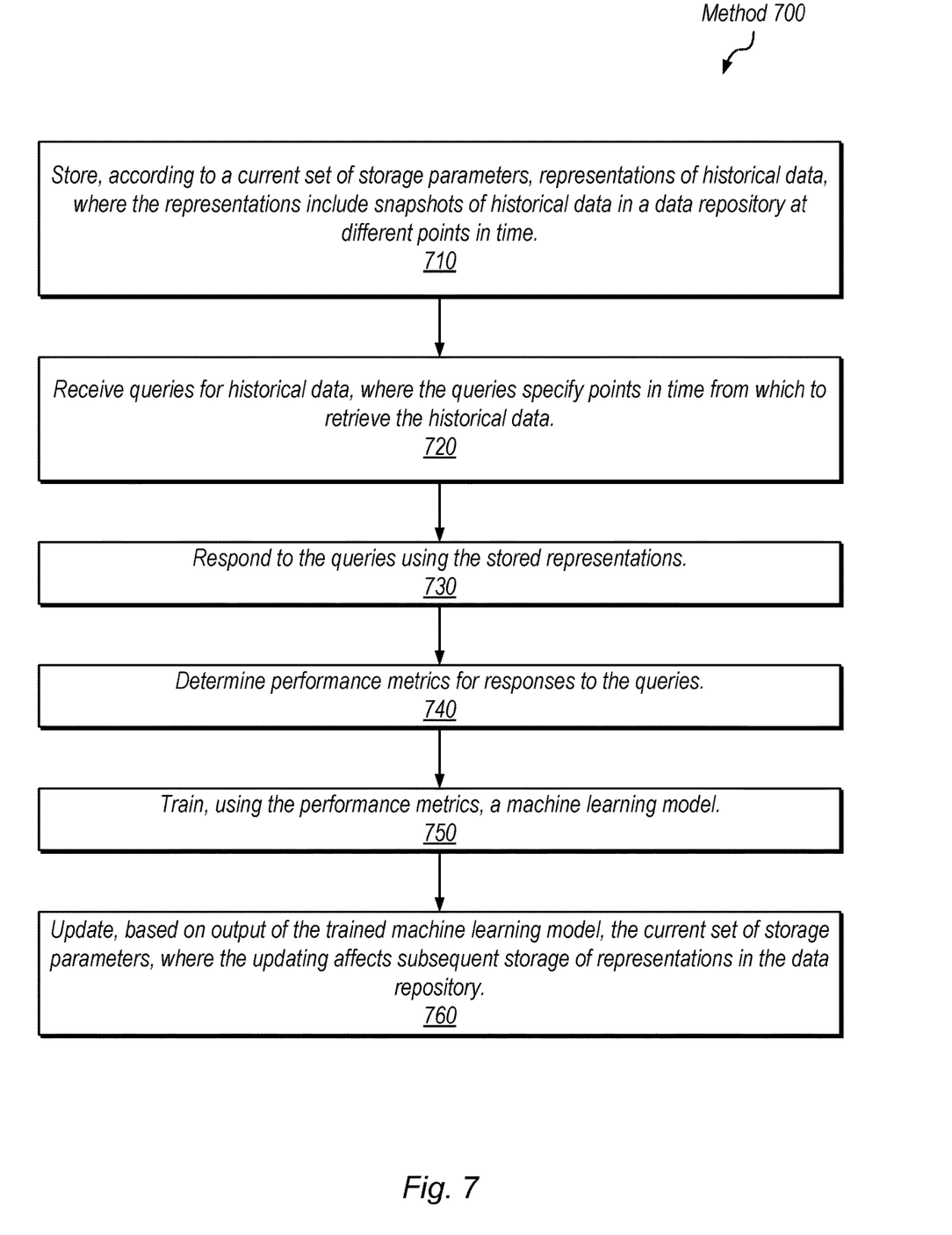
FIG. 7 is a flow diagram illustrating a method for updating a current set of storage parameters for a data repository storing historical data based on output of a machine learning model trained using performance metrics for the data repository, according to some embodiments.

FIG. 7 is a flow diagram illustrating a method for updating a current set of storage parameters for a data repository storing historical data based on output of a machine learning model trained using performance metrics of the data repository, according to some embodiments. The method shown in FIG. 7 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 710, in the illustrated embodiment, a computer system stores, according to a current set of storage parameters, representations of historical data, where the representations include snapshots of historical data in a data repository at different points in time. In some embodiments, the representations of historical data further include journals that indicate changes between ones of the snapshots. In some embodiments, the current set of storage parameters specifies multiple different storage locations for the snapshots including at least a first storage location for snapshots associated with a high access frequency and a second storage location for snapshots associated with a low access frequency.

In some embodiments, the storing includes joining two consecutive snapshots that include records of historical data, where the joining is performed based on primary keys of the two consecutive snapshots. In some embodiments, the storing includes determining, based on the joining, one or more changes between the joined snapshots. In some embodiments, the storing includes generating, based on the determined one or more changes, one or more new journals. In some embodiments, the generating is performed based on a delta threshold included in the current set of storage parameters that specifies a number of changes to be included in respective journals. For example, one or more journals may include a single change between two consecutive snapshots.

In some embodiments, the current set of storage parameters includes a parameter specifying a payload threshold, where the storing the snapshots is performed based on a total size of one or more journals used to generate the snapshots satisfying the payload threshold. In some embodiments, the total size of the one or more journals corresponds to latency in responding to a particular one of the queries. For example, if the total size (e.g., in bytes) of a set of journals needed to respond to a query is too large, the computer system may generate snapshots to reduce latency of the query.

In some embodiments, the storing includes generating one or more new snapshots based on the one or more new journals, where the generating is performed based on a journal threshold included in the current set of storage parameters. For example, prior to receiving queries for historical data, a snapshot generator module included in the computer system is operable to generate an intermediate snapshot between two consecutive snapshots if there are more than three journals between the two snapshots. In some embodiments, the journal threshold specifies at least one of: a number of journals to be included in respective snapshots, a total size of one or more journals to be included in respective snapshots, and a window of time from which to select one or more journals to be included in respective snapshots. For example, the snapshot generator module may generate new snapshots more frequently for records with more changes between consecutive snapshots.

At 720, the computer system receives queries for historical data, where the queries specify points in time from which to retrieve the historical data. In some embodiments, a single query specifies multiple different points in time from which to retrieve historical data.

At 730, the computer system responds to the queries using the stored representations. In some embodiments, responding to the queries includes generating, by the computer system based on historical data included in the stored representations, one or more sets of unlabeled features, where the one or more sets of unlabeled features are usable to train different instances of a machine learning classifier. In some embodiments, results of comparing output of the different trained instances of the machine learning classifier with output of another instance of the machine learning classifier trained using a set of labeled features provide performance indicators for the different trained instances.

In some embodiments, responding to a particular query includes reading, from a snapshot database, a prior snapshot that includes historical data at a first point in time that is prior to a particular point in time specified in the particular query, where the prior snapshot is a closest prior snapshot to the particular point in time. In some embodiments, responding to the particular query includes reading, from a journal database, one or more journals indicating changes between historical data included in the prior snapshot and historical data at the particular point in time. In some embodiments, responding to the particular query includes generating, based on the prior snapshot and the one or more journals, at least one new snapshot at the particular point in time, where the generating includes replaying the one or more journals on top of the prior snapshot. In some embodiments, the reading the prior snapshot and the reading the one or more journals are performed in parallel based on a known distribution of points in time of snapshots stored in the snapshot database.

In some embodiments, responding to a particular query that specifies a first point in time includes determining, based on the current set of storage parameters, whether to generate a new snapshot for responding to the particular query. In some embodiments, in response to determining to generate the new snapshot, the computer system replays one or more journals on top of a prior snapshot, where the one or more journals are associated with points in time between a point in time associated with the prior snapshot and the first point in time.

At 740, the computer system determines performance metrics for responses to the queries. In some embodiments, the performance metrics include an access metric specifying a frequency at which one or more of the snapshots are accessed for responses to the queries, and wherein the updating the current set of storage parameters that is performed based on the access metric includes adjusting a storage location for one or more of the snapshots. In some embodiments, the performance metrics include a latency metric indicating a time interval between receiving queries and generating responses using stored snapshots and journals, where the updating that is performed based on the latency metric includes adjusting a number of stored snapshots and a number of stored journals.

At 750, the computer system trains, using the performance metrics, a machine learning model. The machine learning model may be trained using any of the various machine learning techniques discussed above with reference to FIG. 1, for example.

At 760, the computer system updates, based on output of the trained machine learning model, the current set of storage parameters, where the updating affects subsequent storage of representations in the data repository. In some embodiments, the updating includes adjusting, by the computer system based on a predicted journal age output by the trained machine learning model, an age threshold included in the current set of storage parameters, where the computer system is configured to generate a snapshot from one or more journals based on the one or more journals being older than a particular point in time specified by the age threshold. In some embodiments, the output of the trained machine learning model includes a predicted configuration for a snapshot database used by the computer system for storing snapshots and a predicted configuration for a journal database used by the computer system to store journals.

In some embodiments, the updating includes moving, by the computer system, one or more journals from a first storage media associated with a low access frequency to a second storage media associated with a high access frequency, where the moving is performed based on a high predicted access frequency for the one or more journals. In some embodiments, the high predicted access frequency is output by the trained machine learning model. Moving journals or snapshots, or both, from low access frequency storage to high access frequency storage may be performed on both journal database 460 and snapshot database 450 shown in FIG. 4, for example.

Example Computing Device

Figure 8:
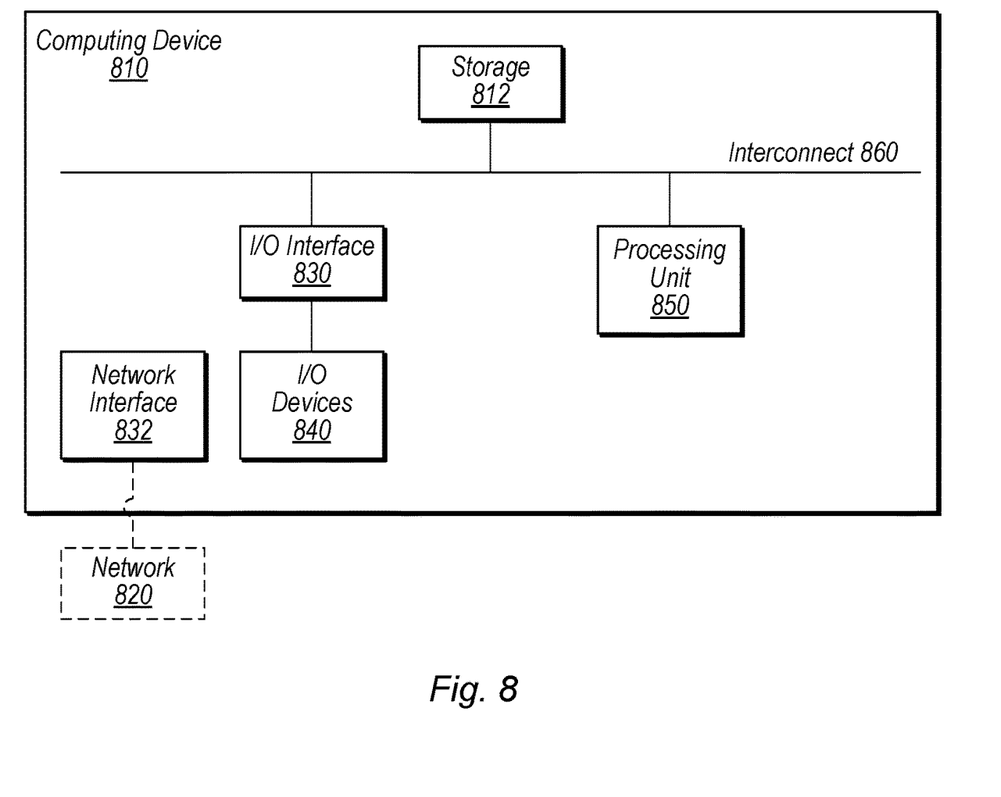
FIG. 8 is a block diagram illustrating an example computing device, according to some embodiments.

Turning now to FIG. 8, a block diagram of one embodiment of computing device (which may also be referred to as a computing system) 810 is depicted. Computing device 810 may be used to implement various portions of this disclosure. Computing device 810 may be any suitable type of device, including, but not limited to, a personal computer system, desktop computer, laptop or notebook computer, mainframe computer system, web server, workstation, or network computer. As shown, computing device 810 includes processing unit 850, storage 812, and input/output (I/O) interface 830 coupled via an interconnect 860 (e.g., a system bus). I/O interface 830 may be coupled to one or more I/O devices 840. Computing device 810 further includes network interface 832, which may be coupled to network 820 for communications with, for example, other computing devices.

In various embodiments, processing unit 850 includes one or more processors. In some embodiments, processing unit 850 includes one or more coprocessor units. In some embodiments, multiple instances of processing unit 850 may be coupled to interconnect 860. Processing unit 850 (or each processor within 850) may contain a cache or other form of on-board memory. In some embodiments, processing unit 850 may be implemented as a general-purpose processing unit, and in other embodiments it may be implemented as a special purpose processing unit (e.g., an ASIC). In general, computing device 810 is not limited to any particular type of processing unit or processor subsystem.

Storage subsystem 812 is usable by processing unit 850 (e.g., to store instructions executable by and data used by processing unit 850). Storage subsystem 812 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 812 may consist solely of volatile memory, in one embodiment. Storage subsystem 812 may store program instructions executable by computing device 810 using processing unit 850, including program instructions executable to cause computing device 810 to implement the various techniques disclosed herein.

I/O interface 830 may represent one or more interfaces and may be any of various types of interfaces configured to couple to and communicate with other devices, according to various embodiments. In one embodiment, I/O interface 830 is a bridge chip from a front-side to one or more back-side buses. I/O interface 830 may be coupled to one or more I/O devices 840 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features.

In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
  storing, by a computer system according to a current set of storage parameters, representations of historical data, wherein the representations include snapshots of historical data in a data repository at different points in time:
  receiving, by the computer system, queries for historical data, wherein the queries specify points in time from which to retrieve the historical data:
  responding, by the computer system, to the queries using the stored representations, wherein the stored representations include prior snapshots and journals, and wherein the responding includes:
    reading, in parallel from a snapshot database and a journal database, at least one prior snapshot and one or more journals, wherein the reading in parallel is performed based on a known distribution of points in time of snapshots stored in the snapshot database:
    generating, based on the historical data included in the stored representations, one or more sets of unlabeled features:
    training, using the one or more sets of unlabeled features, different instances of a machine learning classifier: and
  determining, by the computer system, performance metrics for responses to the queries:
  training, by the computer system using the performance metrics, a machine learning model: and
  updating, by the computer system based on output of the trained machine learning model, the current set of storage parameters wherein the updating affects subsequent storage of representations in the data repository.

2. The method of claim 1, wherein responding to the queries further includes:
comparing output of the different trained instances of the machine learning classifier with a machine learning classifier trained using a set of labeled features, wherein results of the comparing provide performance indicators for the different trained instances.

3. The method of claim 1, wherein the representations of historical data further include journals that indicate changes between ones of the snapshots.

4. The method of claim 3, wherein the storing includes:
joining two consecutive snapshots that include records of historical data, wherein the joining is performed based on primary keys of the two consecutive snapshots;
determining, based on the joining, one or more changes between the joined snapshots; and
generating, based on the determined one or more changes, one or more new journals.

5. The method of claim 4, wherein the generating is performed based on a delta threshold included in the current set of storage parameters that specifies a number of changes to be included in respective journals.

6. The method of claim 4, wherein the storing includes:
generating one or more new snapshots based on the one or more new journals, wherein the generating is performed based on a journal threshold included in the current set of storage parameters.

7. The method of claim 6, wherein the journal threshold specifies at least one of: a number of journals to be included in respective snapshots, a total size of one or more journals to be included in respective snapshots, a window of time from which to select one or more journals to be included in respective snapshots.

8. The method of claim 1, wherein the responding that includes reading the at least one prior snapshot and one or more journals includes, for a particular query:
reading, from a snapshot database, a prior snapshot that includes historical data at a first point in time that is prior to a particular point in time specified in the particular query, wherein the prior snapshot is a closest prior snapshot to the particular point in time;
reading, from a journal database, one or more journals indicating changes between historical data included in the prior snapshot and historical data at the particular point in time; and
generating, based on the prior snapshot and the one or more journals, at least one new snapshot at the particular point in time, wherein the generating includes replaying the one or more journals on top of the prior snapshot.

9. The method of claim 1, wherein the performance metrics include an access metric specifying a frequency at which one or more of the snapshots are accessed for responses to the queries.

10. The method of claim 9, wherein the updating the current set of storage parameters that is performed based on the access metric includes adjusting a storage location for one or more of the snapshots.

11. The method of claim 1, wherein the current set of storage parameters specifies multiple different storage locations for the snapshots including at least a first storage location for snapshots associated with a high access frequency and a second storage location for snapshots associated with a low access frequency.

12. A non-transitory computer-readable medium having instructions stored thereon that are executable by a computer device to perform operations comprising:
storing, according to a current set of storage parameters, snapshots and journals, wherein the snapshots include records of historical data in a data repository at different points in time, and wherein the journals indicate changes between ones of the snapshots:
receiving a query for historical data, wherein the query specifies a particular point in time from which to retrieve the historical data:
responding to the query using the stored snapshots and journals, wherein the responding includes:
reading, in parallel from a snapshot database and a journal database, at least one prior snapshot and one or more journals, wherein the reading in parallel is performed based on a known distribution of points in time of snapshots stored in the snapshot database:
generating, based on the historical data included in the at least one prior snapshot and the one or more journals, one or more sets of unlabeled features:
transmitting, to a computing device from which the query was received, the one or more sets of unlabeled features, wherein the computing device is configured to train different instances of a machine learning classifier using the one or more sets of unlabeled features:
generating, based on a closest prior snapshot to the particular point in time and one or more journals indicating changes between the historical data included in the closest prior snapshot and historical data at the particular point in time, at least one new snapshot at the particular point in time: and
determining performance metrics for the response to the query:
training, using the performance metrics, a machine learning model: and
updating, based on output of the trained machine learning model, the current set of storage parameters.

13. The non-transitory computer-readable medium of claim 12, wherein the performance metrics include a latency metric indicating a time interval between receiving queries and generating responses using stored snapshots and journals, and wherein the updating that is performed based on the latency metric includes adjusting a number of stored snapshots and a number of stored journals.

14. The non-transitory computer-readable medium of claim 13, wherein the updating includes:
adjusting, based on a predicted journal age output by the trained machine learning model, an age threshold included in the current set of storage parameters, wherein the computer device is configured to generate a snapshot from one or more journals based on the one or more journals being older than a particular point in time specified by the age threshold.

15. The non-transitory computer-readable medium of claim 12, wherein the responding to a particular query that specifies a first point in time includes:
determining, based on the current set of storage parameters, whether to generate a new snapshot for responding to the particular query; and
in response to determining to generate the new snapshot, replaying one or more journals on top of a prior snapshot, wherein the one or more journals are associated with points in time between a point in time associated with the prior snapshot and the first point in time.

16. The non-transitory computer-readable medium of claim 12, wherein the current set of storage parameters includes a parameter specifying a payload threshold, wherein the storing the snapshots is performed based on a total size of one or more journals used to generate the snapshots satisfying the payload threshold, and wherein the total size of the one or more journals corresponds to latency in responding to a particular one of the queries.

17. A method, comprising:

storing, by a computer system according to a current set of storage parameters, snapshots and journals, wherein the snapshots include records of historical data in a data repository at different points in time, and wherein the journals indicate changes between ones of the snapshots:

receiving, by the computer system, queries for historical data, wherein the queries specify points in time from which to retrieve the historical data:

responding, by the computer system, to the queries using the stored snapshots and journals, wherein responding to the queries includes:

reading, in parallel from a snapshot database and a journal database, at least one prior snapshot and one or more journals, wherein the reading in parallel is performed based on a known distribution of points in time of snapshots stored in the snapshot database:

generating, based on the historical data included in the stored snapshots and journals, one or more sets of unlabeled features for training different instances of a machine learning classifier for classifying electronic transactions:

transmitting the one or more sets of unlabeled features to one or more entities associated with the queries for historical data: and determining, by the computer system, performance metrics for responses to the queries:

training, by the computer system using the performance metrics, a machine learning model: and updating, by the computer system based on output of the trained machine learning model, the current set of storage parameters.

18. The method of claim 17, wherein the updating includes:

adjusting, by the computer system based on a predicted journal age output by the trained machine learning model, an age threshold included in the current set of storage parameters, wherein the computer system is configured to generate a snapshot from one or more journals based on the one or more journals being older than a particular point in time specified by the age threshold.

19. The method of claim 17, wherein the output of the trained machine learning model includes a predicted configuration for a snapshot database used by the computer system for storing snapshots and a predicted configuration for a journal database used by the computer system to store journals.

20. The method of claim 17, wherein the updating includes:

moving, by the computer system, one or more journals from a first storage media associated with a low access frequency to a second storage media associated with a high access frequency, wherein the moving is performed based on a high predicted access frequency for the one or more journals, and wherein the high predicted access frequency is output by the trained machine learning model.

* * * * *